No. 763,569. PATENTED JUNE 28, 1904.
E. L. SCHANCK.
CORN HARVESTER.
APPLICATION FILED OCT. 19, 1903.
NO MODEL. 3 SHEETS—SHEET 2.

WITNESSES:
S. Edwin Ward.
A. L. Phelps

INVENTOR
Ephraim L. Schanck

BY
C. C. Shepherd
ATTORNEY

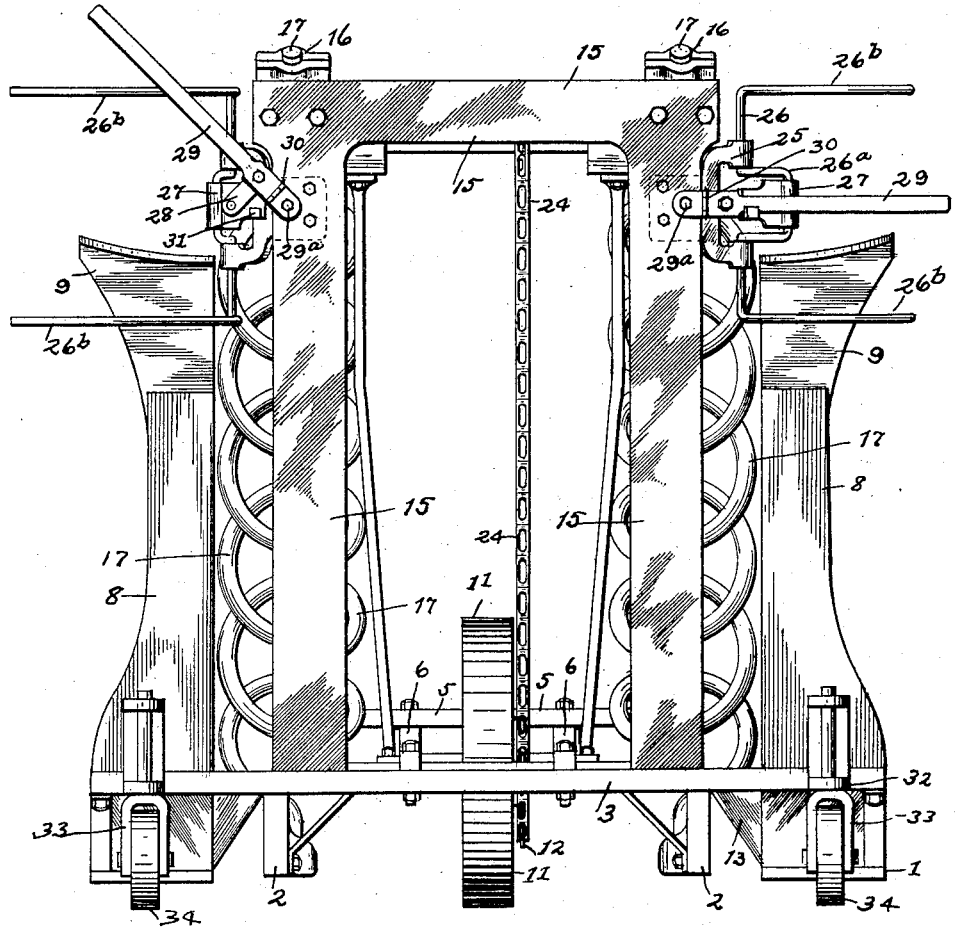

No. 763,569. Patented June 28, 1904.

UNITED STATES PATENT OFFICE.

EPHRAIM L. SCHANCK, OF DELAWARE, OHIO.

CORN-HARVESTER.

SPECIFICATION forming part of Letters Patent No. 763,569, dated June 28, 1904.

Application filed October 19, 1903. Serial No. 177,563. (No model.)

*To all whom it may concern:*

Be it known that I, EPHRAIM L. SCHANCK, a citizen of the United States, residing at Delaware, in the county of Delaware and State of Ohio, have invented a certain new and useful Improvement in Corn-Harvesters, of which the following is a specification.

My invention relates to the improvement of corn-harvesters; and the objects of my invention are to provide an improved corn-harvester of comparatively simple construction and arrangement of parts, to so construct my improved harvester as to provide for the cutting of two rows of corn at the same time, to provide improved mechanism whereby "down" corn or bent or inclined stalks will be raised to an upright position before cutting, to provide improved means for cutting and collecting the stalks and improved means for feeding or conveying the stalks to the cutting and collecting point, to provide improved means for releasing the collected stalks from the machine, and to produce other improvements the details of which will be more fully pointed out hereinafter. These objects I accomplish in the manner illustrated in the accompanying drawings, in which—

Figure 1:
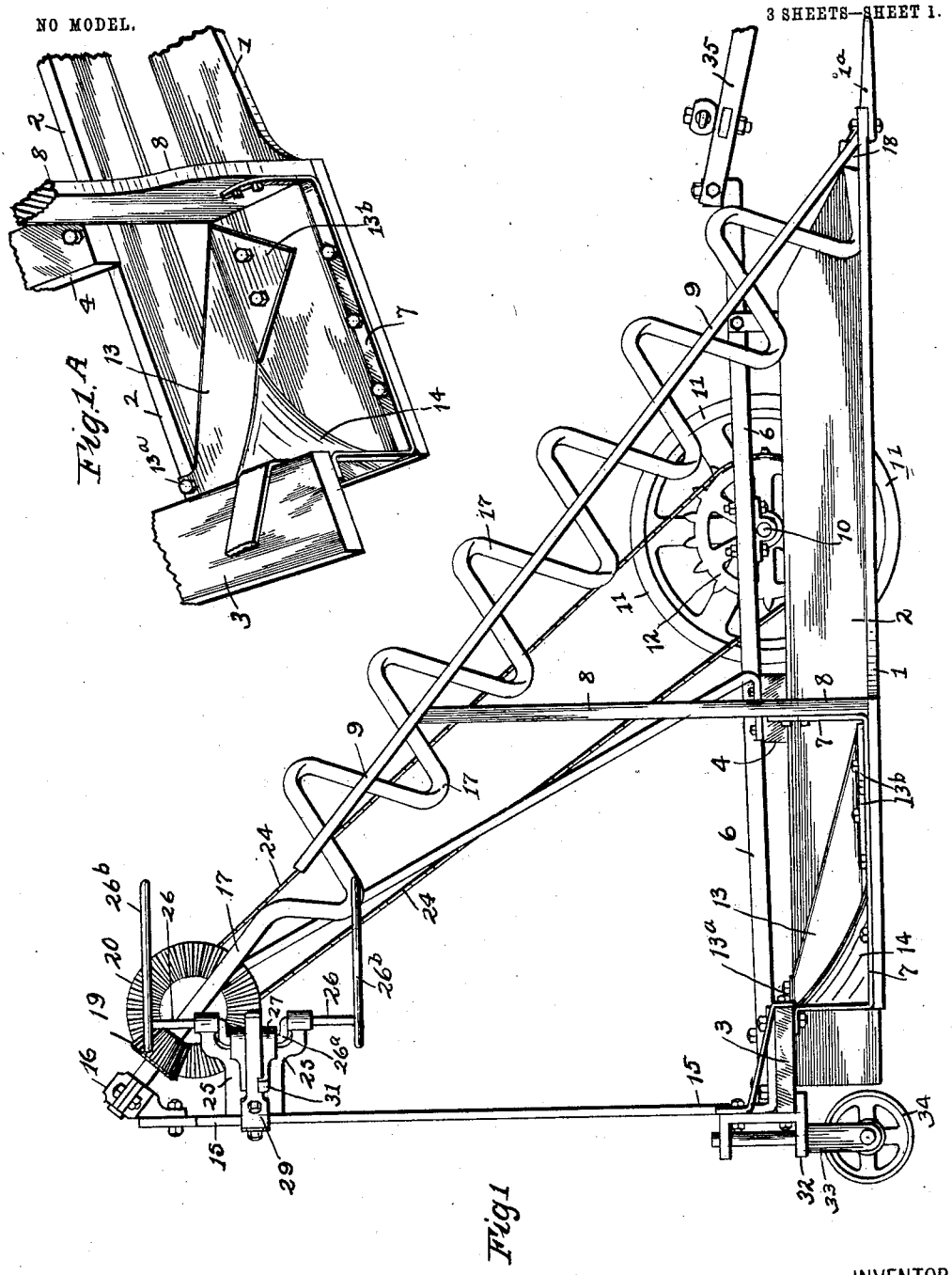
Figure 2:
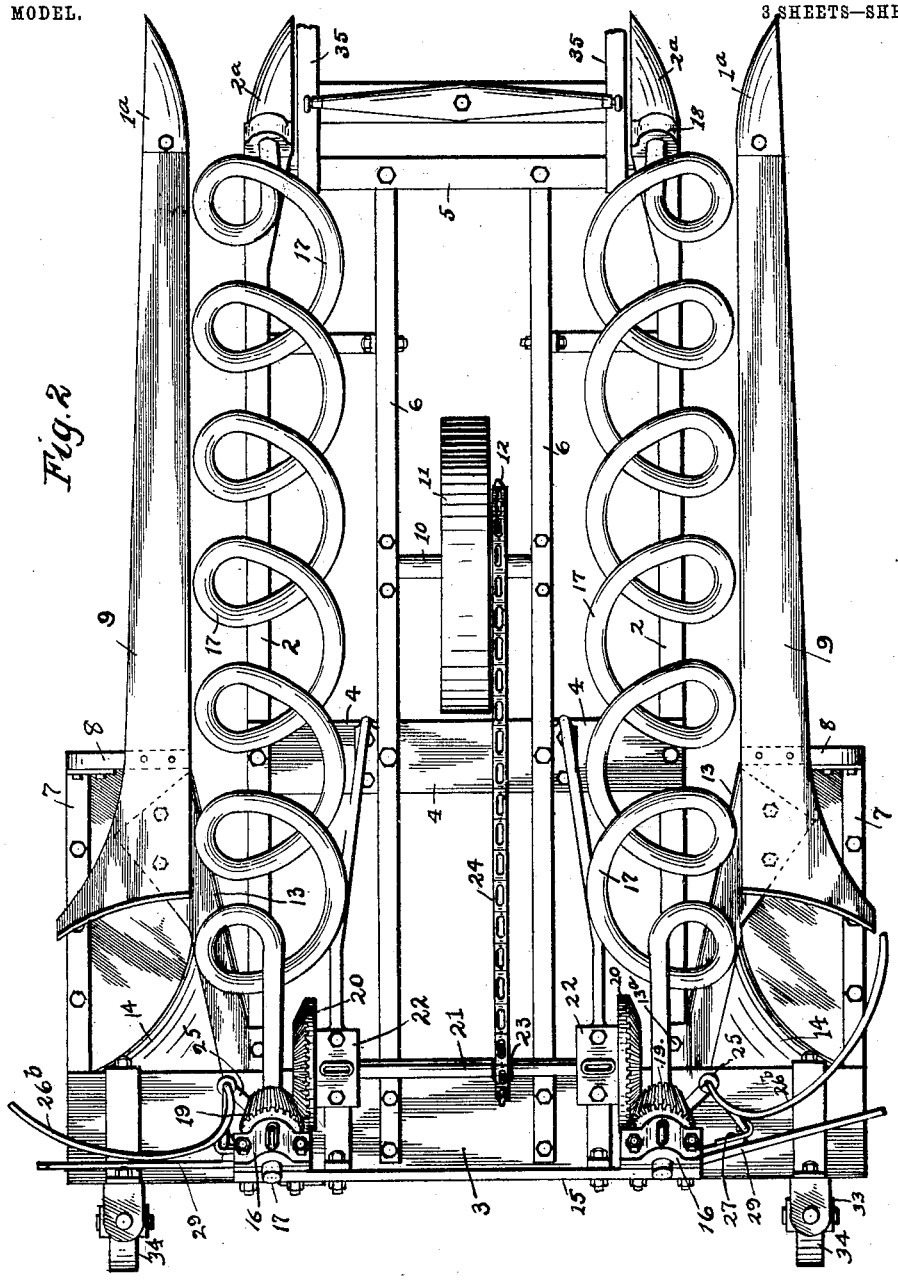

Figure 1 is a side elevation of my improved machine. Fig. 1$^A$ is a detail view in perspective of one of the stalk receptacles and cutting devices. Fig. 2 is a plan view of the same, and Fig. 3 is a rear elevation thereof.

Similar numerals refer to similar parts throughout the several views.

In carrying out my invention I employ a suitable framework comprising parallel horizontal frame pieces or boards 1, which at their forward ends have their inner sides curved or beveled to form terminal points 1$^a$. On the inner sides of the frame-pieces 1 and parallel therewith are sills 2, the forward end portions of which, as indicated at 2$^a$, terminate in points. The sills 2 and side pieces 1 are connected at the rear end of the machine through the medium of a transverse frame-piece 3, while an intermediate transversely-arranged connecting frame-piece 4 and a forward frame-piece 5 also connect the sills 2. Between the sills 2 are arranged longitudinally of the machine parallel frame-bars 6, which extend between the transverse bars 3 and 5 and which are inclined upward toward their forward ends. As shown more clearly in Fig. 1 of the drawings, the connection between the rear frame-piece 3 and side pieces 1 is preferably effected by a metal bar 7, one of which depends from the under side of each end of the frame-piece 3 and which, being bent forwardly at a point below said frame-piece, has its horizontal portion secured to the upper side and outer portion of the frame-piece 1, said bar terminating at its forward end in an upturned portion which is secured to the rear side of a vertical standard 8, one of which rises from each of the side pieces 1. The upper ends of these standards 8 are secured to the under sides of and serve to support the rear end portions of forwardly-inclined guard or guide boards 9. The lower and forward ends of the inclined boards 9 are secured to the outer end portions of the frame-pieces 1. Between the inner frame-bars 6 is journaled a shaft 10, the latter carrying a ground-wheel 11, which, as shown, projects below the lower framework of the machine. The shaft 10 also carries a sprocket-wheel 12.

As will be more fully described hereinafter, it is designed that the stalks of the corn shall be cut in the rear portion of the machine, and in accomplishing this object a cutting-blade 13 is provided on each side of the machine, which has its rear and upper end secured to the upper side of the corresponding sill 2 at 13$^a$ and its forward end turned outward and secured to the upper side of the corresponding frame-board 1 at 13$^b$ immediately in rear of the standard 8. That portion of each of the cutting-blades which thus bridges the space between the upper sides of a sill 2 and a frame-piece 1 is in addition to its forward inclination inclined inwardly, this inward inclination being indicated more clearly in Fig. 2. From the above description it will be seen that the cutting-blades form, substantially, the inner sides of the box-like spaces or receptacles which are between the standards 8 and the rear vertical portions of the bars 7. If required, I may provide in the rear portion of each of these box-like spaces an inclined end plate or sheet 14, so shaped as to cover such angular space as may exist between the under side of the rear portion of the blade 13 and the bottom of the side piece 1. It is obvious, however, that the blade itself may be of such shape in its rear portion as to cover such opening or space. Rising from the rear transverse frame-piece 3 is an upright frame 15, and journaled in suitable bearing-boxes 16, which are supported from the upper side and on opposite sides of the center of the width of said frame 15, are the upper and straight end portions of screw shafts or coils 17. These screw-shafts have their coiled portions extending forwardly and downwardly and have their lower ends journaled in suitable bearings or brackets 18, which are supported on the upper sides of the forward end portions of the sills 2. As indicated in the drawings, these screw-shafts 17 are arranged, respectively, on the inner sides of the guard-boards 9, and the upper and straight portion of each of said shafts carries a beveled pinion 19. These pinions 19 gear with bevel-wheels 20, which are carried on the ends of a transverse shaft 21, said shaft being journaled in suitable boxings 22, supported from the rear framework 15. The shaft 21 carries at a point between its bearings a sprocket-wheel 23, and an endless chain 24 connects said sprocket-wheel 23 with the sprocket-wheel 12. From each side of the rear frame 15 near its upper portion is supported a forwardly and laterally projecting bracket 25, said bracket being of a substantially yoke form.

26 represents cornstalk-receiving cradles or keepers, each of which consists of a rod or equivalent body provided centrally with a crank-bend 26$^a$, the upper and lower end portions of said rod having hook or C shaped terminations 26$^b$. The vertical portions of each of the cradles or stalk-receivers 26 above and below its crank-bend are journaled in the outwardly-extending arms of the bracket 25, while the vertical portion of the crank 26$^a$ is journaled in the outer portion of a short arm 27, which in turn is pivotally connected with one end of a bar 28. This bar 28 has its remaining end pivotally connected with the inner end portion of a lever 29. This lever 29 is at its inner end pivoted at 29$^a$ to the rear frame 15 and on the outer side of its pivot-point is provided with an intermediate hinge 30. As shown in the drawings, the lever-bar 29 on the outer side of its hinged point normally lies in engagement with a keeper or catch-finger 31, which projects outwardly and upwardly from the lower side of the member 27.

At the rear end corners of the machine are provided suitable caster-brackets 32, in which are pivotally mounted wheel-hangers 33, the latter in turn carrying pivoted caster-wheels 34, adapted to bear and run upon the ground.

Suitably connected with the front end of the framework of the machine are the rear portions of a pair of vehicle-shafts 35. While no driver's seat is shown in the drawings, the same being omitted for the sake of clearness in illustration, it is obvious that any suitable or well-known form of seat may be supported from the forward or any desirable portion of the machine-frame between the screw-shafts.

The operation of my improved machine is substantially as follows: In traveling into or through a field of corn to be cut the machine is so guided as to bring two parallel corn-rows opposite the forward entrances of the spaces which are between the side frame-pieces 1 and the sills 2. Rotary motion is imparted to the screw-coiled shafts through the chain-belt connections of the sprocket-wheels 12 and 23 and gear connections between the shaft 21 and said screw-shafts. The cornstalks are, as will readily be understood, engaged and retained in vertical positions by the coils of the revolving screw-shafts, the latter thus feeding forward until the stalks successively come into contact with the inner edges of the inclined knife-blades 13, resulting in the stalks being severed and in the rear elevated portion of the machine-frame passing over the stubs of the stalks without undesirable interference therewith. It will be readily understood that the lower ends of the cut stalks will by the continued movement of the machine be carried over the knife-blade and into the receptacles, which, as indicated in Fig. 1$^A$, are formed between the rear frame-piece 3 and the standards 8. It will also be seen that the upper portions of the stalks will be received and retained by the curved arms 26$^b$ of the cradles 26. When a sufficient number of cut stalks have thus accumulated within the arms of the cradle and within the receptacle, the machine may be stopped and the accumulated stalks removed therefrom by raising the levers 29 out of engagement with the guide projections 31, one of these levers being thus shown at the left in Fig. 3 of the drawings.

The raising of the lever and the consequent raising of the inner end of the bar 28 results through the shortening of the distance between the pivot-point of the bar 28 and the pivot-point of the lever in a rearward swinging movement of the cradle, thus opening the way for the removal laterally of the accumulated cornstalks from the machine. It will be understood, however, that when the levers are raised sufficiently to disengage the same from the catch projections 31 the pressure of the cornstalks against the cradle-arms will be sufficient to swing the latter rearwardly and to the open positions. The shock formed from the assembled stalks which are removed from the machine may be set upright in the usual manner and the machine again started, the levers 29 being first returned to their normal positions.

Owing to the inclined positions of the screw-shafts, it will be seen that down corn or stalks which have been bent from vertical positions will, through engagement with the coils of said shafts, be raised to vertical positions and the cutting operation thereof carried on as readily and easily as where the stalks are standing normally.

From the construction and operation herein shown and described it will be understood that an effective corn-harvesting machine is produced without unnecessary complication or expense. It will also be understood that the framework of my machine, as well as other details of construction, may be changed or altered without affecting the principles of my invention as set forth in the appended claims.

Having now fully described my invention, what I claim, and desire to secure by Letters Patent, is—

1. In a corn-harvester, the combination with a framework comprising longitudinally-arranged frame-pieces forming stalk-guideways, of box-like receptacles open at the top and outer sides, arranged in the rear of said guideways, cutting devices supported in said receptacles, ground-wheels upon which said framework is supported and mechanism driven from a ground-wheel for guiding the cornstalks into contact with the cutting devices.

2. In a corn-harvester, the combination with a framework provided with stalk-guideways, of box-like receptacles arranged at the rear of said guideways, cutting devices supported in said receptacles and stalk-receiving cradles pivoted from the framework, adapted to cooperate with the said receptacles in accumulating cut stalks and means for discharging the stalks from said receptacles and cradles, ground-wheels upon which said framework is supported and mechanism driven from a ground-wheel for guiding the cornstalks into contact with the cutting devices.

3. In a corn-harvester, the combination with a framework provided with stalk-guideways of box-like receptacles arranged at the rear of said guideways, of forwardly and downwardly inclined cutter-blades, pivoted stalk-receiving cradles carried by the framework above said receptacles and comprising curved retaining-arms to cooperate with the said receptacles in accumulating cut stalks, means for operating said pivoted cradles to discharge the cut stalks at each side of the framework, ground-wheels upon which said framework is supported and downwardly-inclined spiral or screw shafts driven from a ground-wheel for guiding the stalks into contact with the cutter-blades.

4. In a corn-harvester, the combination with a framework, comprising longitudinally-arranged frame-pieces forming stalk-guideways of box-like receptacles open at the top and outer sides, arranged in the rear of said guideways, forwardly and downwardly inclined cutter-blades supported in said receptacles, ground-wheels upon which said framework is supported, and mechanism driven from a ground-wheel for guiding the cornstalks into contact with the cutting devices.

5. In a corn-harvester, the combination with a framework provided with stalk-guideways, of box-like receptacles arranged at the rear of such guideways, forwardly and downwardly inclined cutter-blades supported in said receptacles and stalk-receiving cradles pivoted from the framework, adapted to cooperate with said receptacles in accumulating cut stalks and means for discharging the stalks from said receptacles and cradles, ground-wheels upon which said framework is supported and mechanism driven from a ground-wheel for guiding the cornstalks into contact with the cutting devices.

6. In a corn-harvester, the combination with a framework and ground-wheels, and cutting devices supported in the rear portion of said framework, of swinging cradles supported from the framework above said cutting devices, each of said cradles comprising a yoke-like body having terminal curved fingers and an intermediate vertical pivoted portion having a central crank-bend, members 27 with which said crank portions pivotally engage, a lever 29 formed of two hinged sections, one of said sections pivoted to the framework of the machine and a bar 28 pivotally connecting the remaining section of said lever 29 with the member 27 and mechanism operated from a ground-wheel for guiding cornstalks into contact with the cutting devices and into said cradles.

EPHRAIM L. SCHANCK.

In presence of—
C. C. SHEPHERD,
W. L. MORROW.